United States Patent Office 3,813,301
Patented May 28, 1974

3,813,301
PROCESS OF CHARGING AND DISCHARGING A METAL HALOGEN CELL
Peter Carr, Utica, Mich., assignor to Occidental Energy Development Company, Whitcomb, Madison Heights, Mich.
Filed Nov. 18, 1971, Ser. No. 200,062
Int. Cl. H01m 33/00, 29/00
U.S. Cl. 136—86 A   7 Claims

ABSTRACT OF THE DISCLOSURE

An electrode for use in an electrical energy storage device having an aqueous metal halide electrolyte comprising a first side of the electrode a second side whereby the first and second sides are attached thereby forming a channel for flow of the electrolyte therebetween and held in place by a conducting carbonized cement.

BACKGROUND OF THE INVENTION

High energy density batteries are those that normally have available about 50 watt hours per pound. Recently, a breakthrough has been uncovered for a new type of high energy density battery. This breakthrough is described in U.S. Ser. No. 50,054 filed June 26, 1970 now U.S. Pat. 3,713,888 and it is related to a metal halide electrolyte halogen hydrate type system. The disclosure of Ser. No. 50,054 is hereby incorporated by reference. The use of such a system requires the handling of corrosive materials such as chlorine, and aqueous solutions of chlorine as well as the metal halide electrolyte. Such a system is amenable to the use of bipolar electrodes. These electrodes need to be satisfactorily joined. Therefore, in order to use such an electrode, the cement connecting the electrodes must have a satisfactory stability in such an environment. In addition, bi-polar electrodes are desirable in an electrical energy storage device because of the simplicity of design in that only two leads are required one at each end of the stack of electrodes. Therefore, the multiple wires are not necessary for removing electricity at each cell but only at the end of a bank of cells.

An object of the present invention is to provide an electrode which has been cemented together which cement is stable in an aqueous metal halide electrolyte.

Also an object of the present invention is to provide a bi-polar electrode cemented together which cement is stable in an aqueous metal halide electrolyte.

Also an object of the present invention is to provide a stable bi-polar electrode cemented together in an aqueous metal halide electrical energy storage device.

SUMMARY OF THE INVENTION

In an electrical energy storage device especially one which is of a halogen hydrate aqueous metal halide type, described in U.S. Ser. No. 50,054, an electrode is employed comprising a first side and a second side whereby both sides are attached thereby forming a channel for flow of electrolyte. The sides are attached by means of a carbonized cement stable to the environment. The electrode is preferably a bipolar electrode.

DESCRIPTION OF PREFERRED EMBODIMENTS

Figure 1:
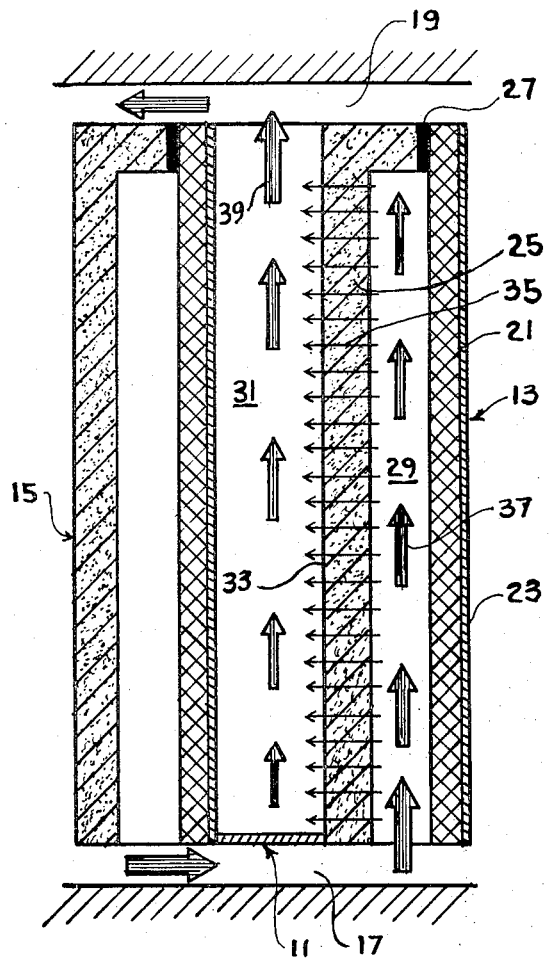
Figure 2:
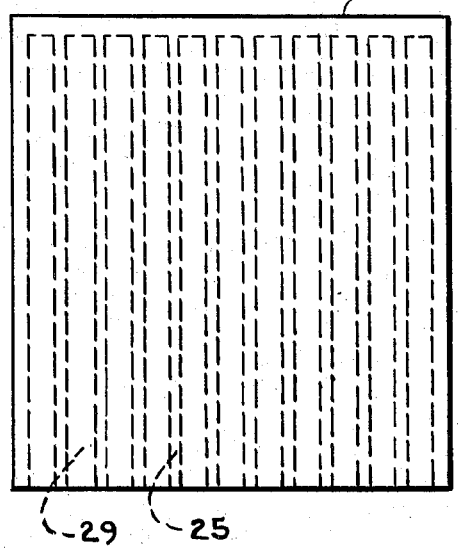

The present invention and its mode of operation will be readily apparent from the following description, taken in conjunction with the accompanying drawing, in which:
FIG. 1 is a central vertical section of a pair of bipolar electrodes of this invention, which form a cell, with the flow of electrolyte into the electrode, through it and into the reactive space of the cell being illustrated;
FIG. 2 is a side elevation of the electrode, seen from the metal coated side thereof; and
FIG. 3 is a bottom plan of the electrode of FIG. 2, showing the flatness of the electrode and illustrating the passageways therein.

FIG. 1 shows an electrolytic cell having two bipolar electrodes 13 and 15 with an area 11 between the electrodes for electrolyte flow. The electrodes are held together in a frame, not illustrated, and are communicating with electrolyte inlet duct 17 and outlet manifold 19. The electrodes each have a gas impervious and electrolyte-impervious wall 21 of graphite, which extends vertically on its outer surface, after charging or fuelling of the secondary battery of which the cell is a part, has a coating or plated layer 23 of highly electropositive metal, e.g., zinc. The inner surface of the impervious wall is cemented to porous electrode base member 25, by an electrically conductive cement layer 27.

By "gas impervious and electrolyte impervious" is meant that the porous side passes substantially more electrolyte through it than the wall 21. The flow rate through wall 21 is extremely low. This is not to mean that no electrolyte will pass through wall 21 but rather that the electrolyte will merely wet and weep through.

Figure 3:
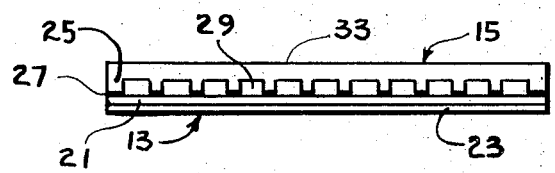

The porous member has a plurality of vertical passageways 29, also well illustrated in FIGS. 2 and 3, through which electrolyte may pass, usually from the lower to the upper portion of the electrode, as shown. Because the porous carbon member has pores or passage in it extending from the inner portion near the vertical passageways to the outer portion, fronting on the reactive zone of the cell, electrolyte pumped into duct 17 by pumping means, not illustrated, penetrates the porous body of member 25 and enters reaction zone 31. Due to the pumping pressure, the flow of the electrolyte is vertically upward and out manifold duct 19 wherein it mixes with other electrolytes from other cells and, after enrichment with chlorine, is recirculated through the electrodes.

An important feature of the electrode is that the inner surface 33 of porous carbon member 25 is maintained in continuing contact with dissolved chlorine that is in the electrolyte passed through the porous member to the reaction zone. No boundary layer of stagnant electrolyte insulates the electrode surface from chlorine, as could be the case if it were to enter the cell only at the bottom of the reaction zone.

Be causing an excess of electrolyte to enter the passageways 29 one maintains them full at all times, prevents the porous carbon member from having a stagnant electrolyte and a deficiency of elemental halogen at an upper surface portion, maintains the desired direction of electrolyte flow, and prevents undesirable backflows. The proportion of electrolyte may be regulated by suitable means, such as by adjustments of valves, not illustrated, or pumping pressures or capacities.

A number of cells of the type illustrated may be joined together in series to form cell banks and these may be further joined in series to increase the voltages developed, in parallel to increase current capacity or in mixed series-parallel, to do both. The batteries made according to the illustration and descriptions given are of an improved power-weight ratio, usually over 50 and preferably over 100 watt-hours per pound and have a theoretical upper limit of about 185 watt-hours/lb., utilizing a zinc chloride solution in which the molar ratio of $ZnCl_2$ to $H_2O$ is about 1:8. Such batteries are strong and are suitable for use in automobiles and trucks, where they withstand the ordinary shocks attending uses of such vehicles. They are also long lasting, comparatively easy to manufacture, utilize readily available materials, recharge well or are easily refuelled, and are efficient and economical to operate. Among the most important advantages of the present batteries, cells and electrodes made from the particular materials of construction and electrolyte, is the passage of the electrolyte so readily and evenly through one of the walls of the bipolar electrode. As indicated by arrows 35 passage of the electrolyte through the porous carbon is even from the bottom to the top while arrows 37, which diminish in size as they move upwardly, indicate the decreasing of the volume of electrolyte flowing in passageway 29. Arrows 39 show the correspondingly increasing volume of electrolyte through reaction zinc 31. It will be evident that without the particular mechanism for contacting surface 33 with chlorine enriched electrolyte, the efficiency of electricity generation at the upper portion of the electrode would be diminished, due to loss of chlorine in the electrolyte as it moves upwardly. Such uneven generation of electric potential at different locations on the electrodes would tend to lead to inefficient operations, due in part to internal short-circuiting.

The framework in which the elements of the present cells are held is of a suitable electrically non-conductive plastic, preferably polyvinyl chloride, PVDC, phenol formaldehyde, chlorinated polyester or acrylonitrilo-butadiene-styrene resin, but may be of hard rubber or other suitable insulative material which is resistant to wet chlorine and aqueous metal (zinc) salt, or metal halide solution. Preferably, the frame is made so that it can accommodate a plurality, e.g., 10 to 30, of bipolar electrodes and provide inlet and outlet ducts or manifolds for them. In some embodiments, the frame is comprised of sections which, together with the electrodes, are held in unit batteries by pressure against them. Some of these embodiments of the invention resemble a plate and frame filter press. Of course, it will be known how to design and manufacture suitable frames to produce batteries from the present cells and to provide electrolyte circulation.

The impervious wall, which usually extends vertically, may be made of any suitable material onto which a metal electrode may be fastened, deposited or plated. Although synthetic organic resins and rubbers may be employed, it is preferred to utilize a carbon which is sufficiently impervious so as to allow the deposit of a smooth metallic coating on the outer side thereof, which will not be loosened by cell or electrolyte pressure because such pressure will not be transmitted through the wall. In some instances porous carbon or graphite may be employed, treated with resins on its outer surface to make it impervious to gas and liquid passage. It is however, much preferred that graphite be utilized since it is an excellent non-metallic conductor, non-reactive with the electrolyte and capable of being readily plated by or otherwise joined to the metal of the electrode surface. Although various thicknesses of the impervious wall portion of the electrode may be used, generally the graphite wall will be from 0.1 to 1.5 millimeters thick, preferably from 0.1 to 1 mm. The electrode itself may be of any of a wide variety of sizes but it will be preferred to utilize one which has a major surface area (corresponding to a single outer platable surface) of from 50 to 1,000 square centimeters, preferably from 100 to 400 sq. cm., which will usually discharge up to 1 ampere per square cm.

The porous member of the electrode is of approximately the same shape and size as the impervious wall, because it is designed to match that wall and to form with it internal passageways for the electrolyte to enter the cell reaction zone. Normally, the porous member will be made from graphite or an activated carbon of animal or vegetable origin such as are well known and have extremely high surface areas, but it can also be produced from the carbon obtained by burning or pyrolyzing oil or gas. Additionally, other known electrode materials which are electrically conductive and sufficiently resistant or inert to the environment may be employed, e.g., sintered titanium or ruthenium oxide. The use of highly divided high surface area particles improves contact of the dissolved chlorine with the inner surface of the porous electrode base, which is a wall of the cell. The porosity of the base, hereafter referred to as carbon, a preferred material, will be such that 20 to 80% of a cross-section thereof is carbon, with the rest being voids suitable for the passage of the electrolyte. Preferably, the porosity will be from 30 to 60%. The porous carbon may be made from granules of powders of activated or other carbons of various sizes and by choices of the powder sizes and resin proportions the sizes of the passageways and the percent carbon in the product can be regulated. Normally, resins are employed to bond the carbon and the resins may be burned off or chemically removed after such bonding is effected, their removal providing paths for the passage of electrolyte. See the Encyclopedia of Chemical Technology (2nd edition), by Kirk and Othmer, vol. 4, p. 58, for a description of suitable electrode materials.

Usually the pores or passages through the porous carbon will have an average diameter of from 5 to 300 microns, preferably from 10 to 100 microns, and most preferably, of 25 to 50 microns. The least transverse thickness of the porous carbon (transverse to the major surface of the electrode walls) will be from 0.3 to 3 millimeters, generally from 0.5 to 2 mm. The porous carbon wall, at its thickest, will be from 1 to 5 times as thick as the graphite wall.

Although either the impervious wall, hereafter referred to as graphite, the most preferred materials, or the porous carbon member may be hollowed out or grooved to contain a plurality of vertical passageways for the electrolyte, it is normally preferred to mold or otherwise form the porous carbon into a suitable shape to contain such passageways. Actually, the sealing of the graphite wall to the porous carbon member is usually used to create the passageways, which are only grooves in the surface of the porous carbon before sealing to the graphite. The numbers of passages will generally be from 5 to 25 and their measurements will be from 0.5 to 2 mm. deep and 0.5 to 5 mm. in width. The ratio of width to depth of the passageways will generally be in the range of 2:1 to 10:1. The porous carbon will be held to the graphite wall by a suitable cement. The thickness of the cement will normally be very low, usually from 0.01 to 0.5 mm., for best results, and it usually covers the entire contact area.

The highly electropositive metal, which may be plated out on the graphite outer surface during charging of the battery by passing a direct current through a metal halide electrolyte in contact with the battery electrodes, may be any suitable metal of a sufficiently high electromotive force to generate a satisfactory battery voltage in conjunction with the halogen employed. Although iron, cobalt and nickel all have sufficiently high E.M.F.'s, the most preferred metal, with the highest practical E.M.F. and lowest comparative weight, and most suitable for use in these processes, is zinc. Other suitable metals are listed in U.S. patent application Ser. No. 50,054, for Process for Electrical Energy Using Solid Halogen Hydrates, and in an application filed the same day as the present application entitled Refuelable Battery, U.S. Ser. No. 200,070, hereby incorporated by reference.

The thickness of the zinc on the graphite electrode is normally from 25 to 4,000 microns thick, preferably from 100 to 1,500 microns but in suitable circumstances, other thicknesses of zinc may be useful. Similar thicknesses of other metals will be used, when they are employed.

The electrolyte is a metal salt corresponding to the metal employed as one electrode surface and the halogen utilized. Although bromine may be the halogen in some embodiments of the invention, it is highly preferable to utilize chlorine. Therefore, the electrolyte salt will usually be zinc chloride. In the electrolyte the concentration of metal chloride in the aqueous medium will normally be about 0.1% by weight to saturation, preferably, 5 to 50% and even more preferably 10 to 35%.

The use of the zinc-chlorine-zinc chloride system is superior to the use of a system depending on bromine because chlorine is lighter than bromine, contributing to the high density of the battery, and additionally, is more readily removed from the electrolyte medium when the battery is being charged. The lower solubility of chlorine is electrolyte decreases its diffusion to the zinc electrode (compared to bromine) and so results in less self-discharge reaction on standing with the zinc. Chlorine, being a gas, passes off and may be easily recovered, preferably as chlorine hydrate, from which it may be liberated when desired for discharging the battery and supplying electricity to external motors, etc.

The concentration of zinc chloride in the electrolyte will usually be 10 to 35%, during both charge and discharge.

The temperature of the electrolyte may vary over a wide range but usually will be from 0° C. to 80° C., preferably from 15° C. to 40° C. Pressures will be 0.5 to 10 atmospheres, preferably 0.8 to 2 atm. and most preferably 1 atm.±10%.

Although other materials are not required in the electrolyte to make the battery operative, it is preferred to add materials which control the deposition of zinc on the cathode to avoid formation of dendrites. Such additives are described in U.S. patent application filed on even date herewith entitled, Battery Electrolyte Composition, U.S. Ser. No. 200,221, hereby incorporated by reference.

In operation, a saturated or nearly saturated solution of zinc chloride containing from 0.1 or 0.2 to 3 volumes of chlorine, at a temperature of 15° C. to 40° C., preferably about 30° C., is directed into the passageways of the electrodes between the impervious carbon and porous carbon sheets and through the pores of the porous carbon into the reaction zone of the cell at a rate such that the linear velocity upward through the cell averages from 2 to 50 cm./second. The pressure differential to have such a flow is in the range of about 0.01 to 1 kg./sq. cm. The cell voltage generated is about 2.1, open circuit, and the finished battery has a capability of supplying about 5,000 watt-hours, with 125 cells.

After passing through the reaction zone, the electrolyte streams are mixed together and additional chlorine is dissolved in the electrolyte to bring it up to the desired content. Preferably, the chlorine is supplied by chlorine hydrate and in some cases, some chlorine hydrate may pass into the cell with the electrolyte and release its chlorine there. The use of chlorine hydrate is especially desirable because the water added with the chlorine reduces the concentration of the zinc chloride which has been increased by the dissolving of some of the zinc and the ionization of the chlorine in a previous pass of the electrolyte through the reaction zone, thus resulting in reasonably constant zinc chloride concentrations. The hydrate may be made by methods described in an application of the present inventors for a U.S. patent, entitled Manufacture of Chlorine Hydrate, filed the same day as the present application and identified as U.S. Ser. No. 200,047, hereby incorporated by reference or in Ser. No. 50,054.

After discharge of the battery the cells thereof are recharged by connecting a source of direct current at the appropriate voltage to the electrodes, with the positive pole of the source being connected to the porous carbon electrode base member and negative pole connected to the impervious graphite wall near the outer surface thereof. Current is caused to flow until a suitable thickness of zinc forms on the graphite wall, indicating sufficient charging. Chlorine developed at the porous electrode base member during charging is removed, separated from the electrolyte and conveniently converted to chlorine hydrate, where it remains as a source of chlorine for use when the battery is to be discharged. Zinc ions from the zinc chloride electrolyte are converted to zinc metal and plate out on the impervious graphite electrode adjacent to the reaction zone. After circulating through the reaction zone the depleted zinc chloride electrolyte passes into contact with a more saturated solution of zinc chloride or solid zinc chloride and the additional amount of the salt is added to the electrolyte to maintain its desired content therein. Instead of replating in situ, the electrodes, cells or cell stacks may be replaced with new or rejuvenated elements after the battery has been nearly discharged. Then the removed parts may be renovated and subsequently used as replacements in other "refuelling" operations.

The batteries made supply electric current continuously in operation and are almost entirely trouble-free. If desired, a diaphragm may be interposed between the porous carbon and the zinc, to prevent contact of chlorine with the zinc. Although this will increase the efficiency of the cell, the cells are operative without diaphragms, which are often omitted because in the thin cells most utilized in the practice of this invention any tendencies of inexpensive diaphragm materials to sag, expand, stretch or become weakened could lead to blocking of electrolyte flow through the cell and could cause ineffectiveness thereof.

The present invention is primarily applicable to an electrical energy storage device as defined in U.S. Ser. No. 50,054. A typical charging of a battery to which the electrode of the present invention is applicable will now be described. The battery comprises a closed system including an electrode area containing at least one positive and one negative electrode. During discharge of the battery, the electrolyte contained in a reservoir is circulated to the electrode area by means of a pump at which dissolved halogen has become ionized by receiving electrons from the electrode, while a metal of which the other electrode is comprised enters the electrolyte solution as an ion. The voltage potential between the positive and negative electrode causes current to flow, as may be desired, while replenishment of the halogen gas in the electrolyte is achieved by the consumption of a halogen hydrate stored in the storage zone.

During a charging of the battery, the electrodes are connected to an external source of electric current during a continued circulation of the electrolyte through the electrode area halogen gas is formed at the positive electrode while the metal ions in the electrolyte are deposited on to the negative electrodes. The elemental halogen gas formed at the positive electrode during charging and is carried by means of the electrolyte to a separation zone which is maintained at a sufficiently cool temperature to effect a solidification of the halogen hydrate which is separated from the electrolyte and thereafter stored in a storage zone. The electrolyte from the separation zone, is again recirculated into the electrode area for entrainment of additional elemental halogen has formed during the recharging operation, in addition to supplying additional metallic ions to the negative electrode for deposition thereon.

More preferably, the present invention is concerned with a bipolar electrode for use in an electrical energy storage device having a first side and a second side of the electrode, a passageway formed by the attachment of the first and second sides thereby allowing an aqueous metal halide electrolyte to flow therebetween and a conducting carbonized cement for securely attaching the first side to the second side of the electrode. Preferably the first side is porous to the flow of the electrolyte with dissolved halogen therein while the second side is impervious to gas and electrolyte flow. While this is a preferred embodiment, the two sides of the electrode could be porous to the flow of electrolyte.

The conducting cement securely holds the sides or faces of the bipolar electrodes together throughout the continuous flow of electrolyte.

In general, the electrodes of the present invention are prepared by joining two dissimilar types of carbonaceous materials with a carbonizable cement. The method of preparing the electrodes prior to the cementing, is familiar to one skilled in the art. See the methods described in Kirk & Othmer, Encyclopedia of Chemical Technology, second edition, volume 4, pages 158–200.

The electrodes can be joined together in the following manner. After a satisfactory electrode material has been selected and grooved for the flow of electrolyte (see FIG. 3), the electrodes are joined together by applying the cementing material at the contact place between the electrodes 27. The electrodes are then heat treated at about 650° centigrade under a non-oxidizing environment. This heat treatment will result in an all carbon or carbon and graphite bond between the electrodes. By subjecting the electrodes to a higher temperature about 2,500° centigrade a more graphite bond can be produced. Preferably temperatures of at least about 800° C. are used.

The cementing materials can be any one of a number of materials. In the case of an all carbon or graphite joint, the electrodes are first bonded together with a carbonizable material such as pitch, tar, furfuryl alcohol, phenolic resin, or carbon and/or graphite filled versions of these carbonizable materials. By "carbonizable" is meant that upon heat treatment, some of the cementing material is converted to carbon, thereby maintaining a cemented bond.

The phenol formaldehyde resins that may be employed are either the linear or cross liked type of resin. The phenols may be a variety of phenols such as phenol itself or an alkylated or halogenated phenol, as well as bisphenols, such as, bisphenol A and bisphenol F.

Some alkylated phenols that may be employed are the mono,- di- or tri-alkyl substituted phenols wherein the number of carbon atoms on the substituent may range from 1 to 12 carbon atoms, such as, methyl, ethyl, propyl, butyl, t-butyl, hexyl, decyl, dodecyl and the like preferably 1 to 6 carbon atoms. The halogenated phenols that may be employed are the mono-, di- or tri-substituted phenols such as mono-, di- or trichloro or bromophenols.

The cementing material may be any one of the above mentioned materials used alone or as mixtures with other substances. Preferably the material resulting after heat treating should contain as much carbon as possible thereby affording good electrical contact.

A mixture of carbon or graphite plus pitch, tar, furfuryl alcohol or phenolic resin may be used where the amount of the resin ranges from about 0.1 to about 10 parts by weight per part of carbon or graphite. The carbon or graphite used is of a fine size ranging from about 65 to about 400 mesh Tyler screen size diameter. A preferred size is a minus 325 mesh.

Example

Using the bipolar electrode of the drawings, the bipolar electrodes are spaced apart about 0.06". The porous and non-porous electrodes are cemented with mixture of a phenolic material that is partially polymerized (Durez Phenolic resin 7347A) and carbon (minus 325 mesh) in a weight of about 2:1 resin carbon and heat treated to about 800° C. The surface area of an electrode is about 29 square inches. During charging current is passed through a 25% by weight aqueous zinc chloride solution at about 0.6 amp per sq. inch with a flow rate of about 600 ml./min. for about 2½ h. resulting in a zinc plate ranging from 10 to 20 mils on the non-porous electrode. The halogen evolved was passed to a halogen hydrate formation apparatus where it is formed and stored. During discharge the hydrate decomposes to chlorine and water and is passed into the electrolyte which is flowing at about 400 ml./min. The voltage during discharge was about 1.5 volts per cell while the amperage was about 0.32 amps/sq. inch. Discharge continued for about 2½ hrs. with the zinc forming zinc ions and the chlorine forming chloride ions.

A bank of 24 cells has an initial voltage of aboute 38 which retained the voltage for about 80% of the discharge phase after which it slowly dropped to about 19 volts, whereupon discharge was terminated.

What is claimed is:

1. A process for charging and discharging a metal, halogen, aqueous metal halide electrical energy storage device having an electrode compartment means, with at least two bipolar electrodes therein and a storage compartment means which can store halogen so that it will be available for discharge, comprising the steps of:
  (1) charging the device by:
    (a) passing electricity through the aqueous metal halide electrolyte solution positioned between the bipolar electrodes, thereby generating halogen at the positive electrodes and depositing the metal from the aqueous metal halide electrolyte onto the front side of the negative electrodes, each said bipolar electrode being comprised of a first carbonaceous member having a front and a back side, a second carbonaceous member having a front side and a back side, a plurality of passageways formed by the attachment of the back sides of the first and second members, a conductive carbonized bond between the back sides of the first and second members, thereby attaching the first and second members securely and further providing that the front side of the first member is a positive electrode in one cell and the front side of the second member is a negative electrode of a second cell in the electrode compartment means, the first member being porous and adapted to pass electrolyte from the passageways through it and the second member being gas and electrolyte impervious;
    (b) passing the electrolyte into the passageways in the bipolar electrodes;
    (c) passing electrolyte through the porous electrode;
    (d) storing the halogen generated during charging in the storage compartment means, so that it will be available during discharge;
  (2) discharging the device by:
    (a) passing the aqueous metal halide electrolyte containing dissolved halogen into the electrode compartment means, said halogen being from the storage compartment means;
    (b) passing the electrolyte containing dissolved halogen into the passageways of the bipolar electrode;
    (c) passing the electrolyte through the porous electrode;
    (d) completing the circuit between the positive and negative electrodes and allowing the electrochemical discharge reaction to occur;
    (e) passing the electrolyte out of the electrode compartment means;
    (f) dissolving additional halogen into the electrolyte; and
    (g) returning to step 2–(a).

2. The process of claim 1, wherein the carbonized bond is a carbonized phenol formaldehyde cement.

3. The process of claim 1 wherein the carbonized bond is partially graphitized.

4. The process of claim 1, wherein the carbonized bond is formed by carbonizing a cement which is a mixture of resin and carbon or graphite in a weight ratio of about 0.1 to about 10 parts by weight of resin per part of carbon or graphite.

5. The process of claim 1, wherein the electrolyte is an aqueous zinc chloride electrolyte having a concentration ranging from about 10% to about 35% by weight and the halogen is stored as chlorine hydrate.

6. The process of claim 1, wherein the metal of the metal halide electrolyte is selected from Group II-B and VIII.

7. The process of claim 1, wherein the halogen electrode is porous graphite and the second member is gas and electrolyte impervious graphite.

References Cited
UNITED STATES PATENTS

| | | | |
|---|---|---|---|
| 3,043,898 | 7/1962 | Miller et al. | 136—86 A |
| 3,188,242 | 6/1965 | Kordesch et al. | 136—86 R |
| 3,227,585 | 1/1966 | Langford et al. | 136—86 E |
| 3,391,027 | 7/1968 | Porter | 136—86 A |

ALLEN B. CURTIS, Primary Examiner

H. A. FEELEY, Assistant Examiner